Figure 1:
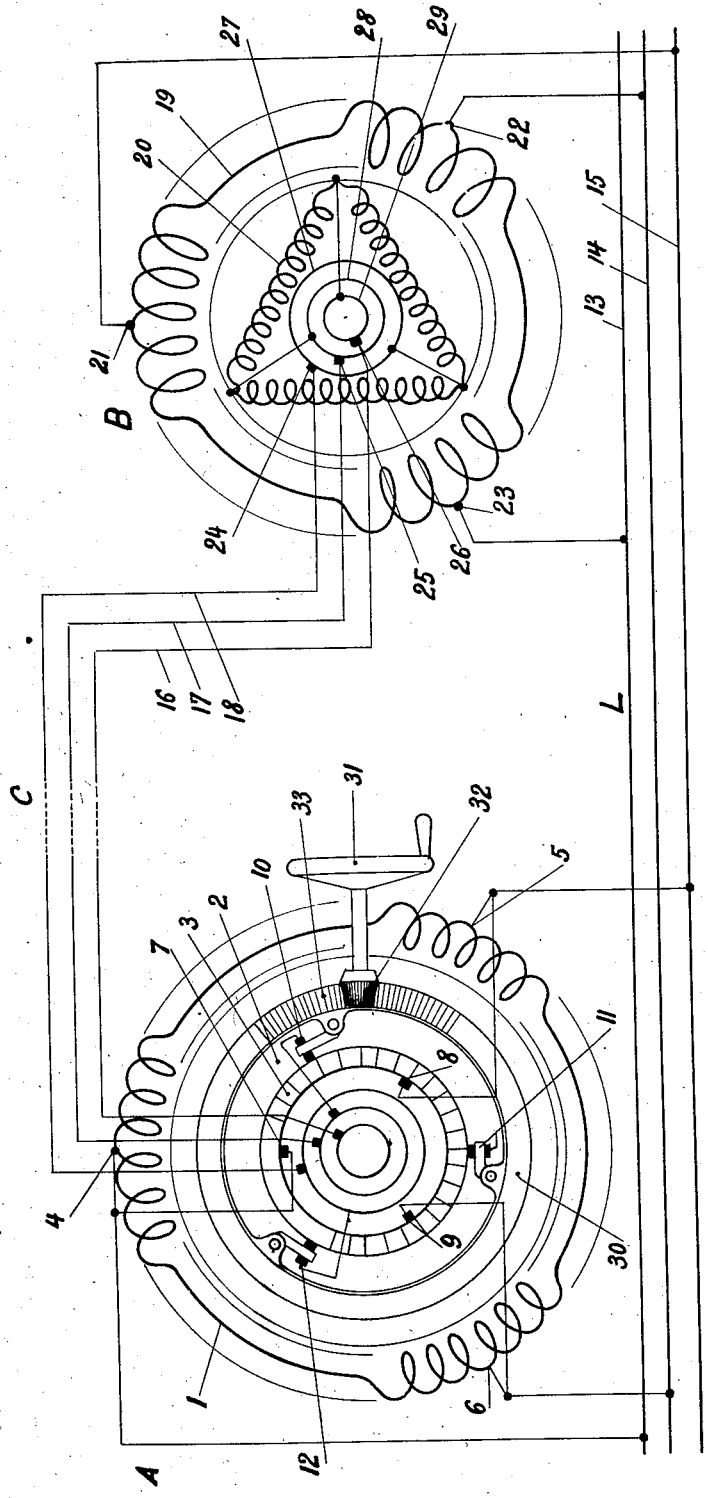

Feb. 8, 1927.

E. GRANAT 1,616,795

POLYPHASE DISTANT CONTROL SYSTEM FOR DIFFERENTIAL TRANSMISSION

Filed Sept. 14, 1925      5 Sheets-Sheet 1

Inventor
E. Granat
By Marks & Clerk
Atty's.

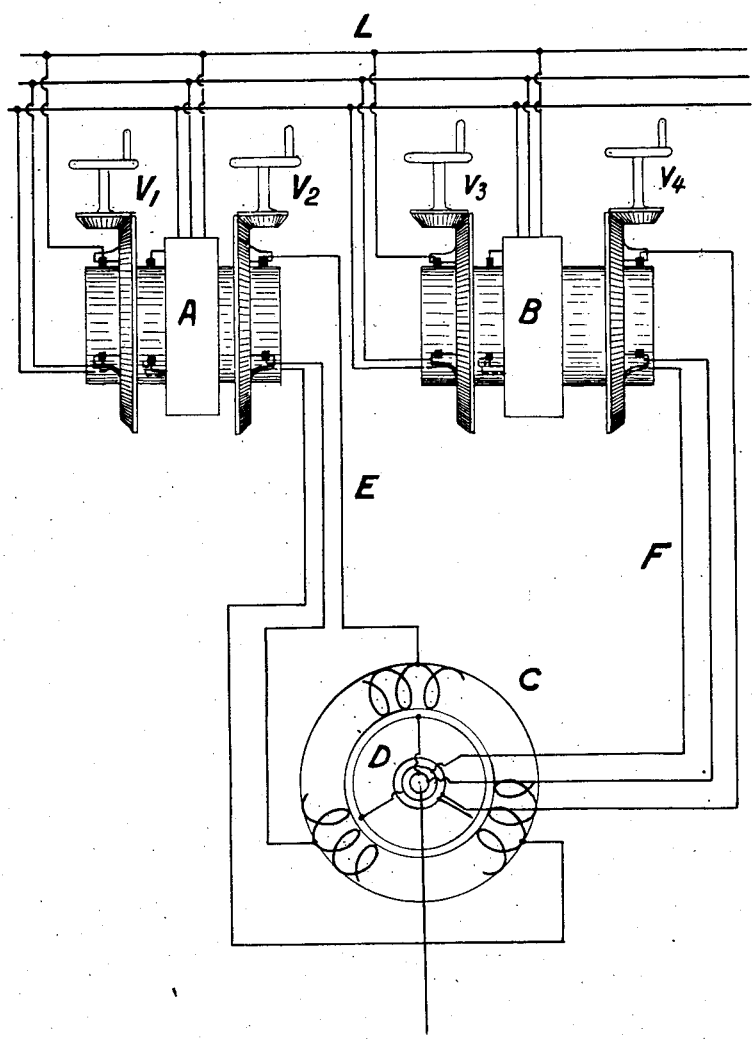

Feb. 8, 1927.

E. GRANAT 1,616,795

POLYPHASE DISTANT CONTROL SYSTEM FOR DIFFERENTIAL TRANSMISSION

Filed Sept. 14, 1925    5 Sheets-Sheet 5

INVENTOR
E. Granat
By Marks & Clerk
attys

Patented Feb. 8, 1927.

1,616,795

UNITED STATES PATENT OFFICE.

ELIE GRANAT, OF PARIS, FRANCE.

POLYPHASE DISTANT-CONTROL SYSTEM FOR DIFFERENTIAL TRANSMISSION.

Application filed September 14, 1925, Serial No. 56,380, and in France September 20, 1924.

The present invention relates to a distant control system utilizing polyphase current.

Arrangements of this class must comply with the following conditions:

1.—The rotation of the receiver, relative to the rotation of the transmitter, should have a constant ratio, in such manner that when the transmitter is rotated through a certain angle, the receiver will rotate in a reliable manner through an angle which corresponds thereto according to predetermined conditions.

2.—The rate of rotation of the receiver should vary within wide limits from zero to the maximum allotted to the controlled apparatus.

Since the system must operate according to this latter condition at rates which are necessarily variable, the electric distant control device is obliged to operate under very difficult circumstances, since in fact the load couple of the actuated apparatus is substantially constant at all speeds, whilst the power couple of the receiver varies with the speed, and will as a rule diminish when the speed increases; so that at a certain speed the power couple will be lower than the load couple, and the control system will fail to operate.

My said apparatus serves chiefly to obviate this drawback by providing a distant control arrangement which will operate under wide variations of load with small variations in the power couple.

The differential transmission is also assured by the adequate dispositions which are set forth hereunder.

The general arrangement essentially comprises a transmitter and a receiver connected together by a line and supplied by polyphase current.

The transmitter is an electric device comprising a stator with polyphase winding which is supplied at N equidistant stationary contact points by the said polyphase line. The rotor, which is of the wire-wound type and is provided with a commutator, is supplied with polyphase current by N equidistant stationary brushes which are connected with the line L, in shunt upon the stator. The said commutator is provided with a rotatable brush holder comprising N brushes which are connected with the line L leading to the receiver.

The receiver comprises a stator with polyphase winding which is supplied at N equidistant contact points which are connected with the line wires L; the polyphase rotor is supplied by the rotatable brushes of the transmitter through the medium of N slip rings and N stationary brushes. Inversely, the stator may be connected with the transmitter, and the rotor with the line. I may further construct a device in which the armature of the transmitter is rotated by means of an auxiliary motor, and herein the transmitter will operate as a generator.

By way of example, which is not of a limitative nature, I have described hereunder and represented in the appended drawings a form of construction of the said electric distant control device which is supplied with alternating current, as well as various modifications.

Figure 3:
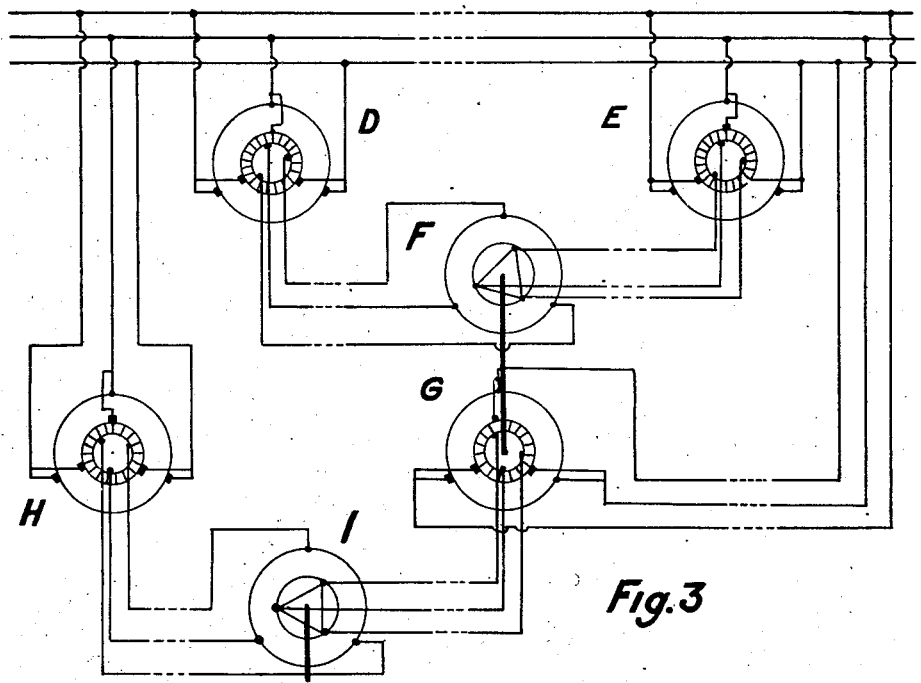
Figure 2:
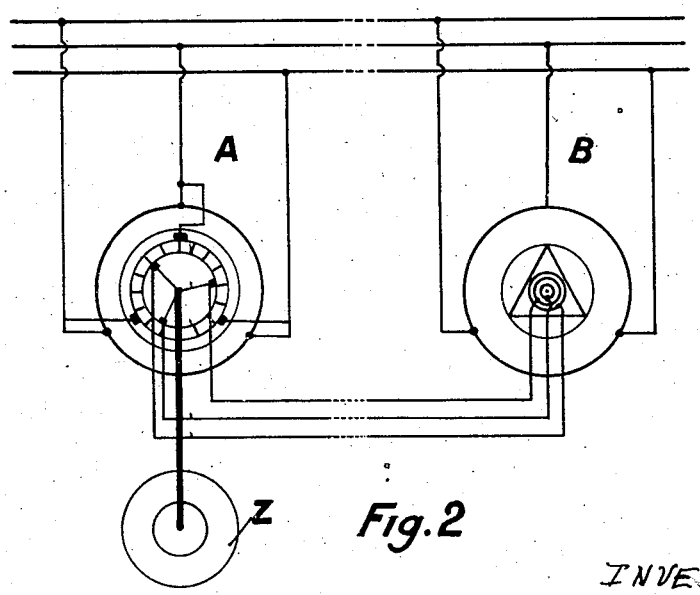
Figure 4:
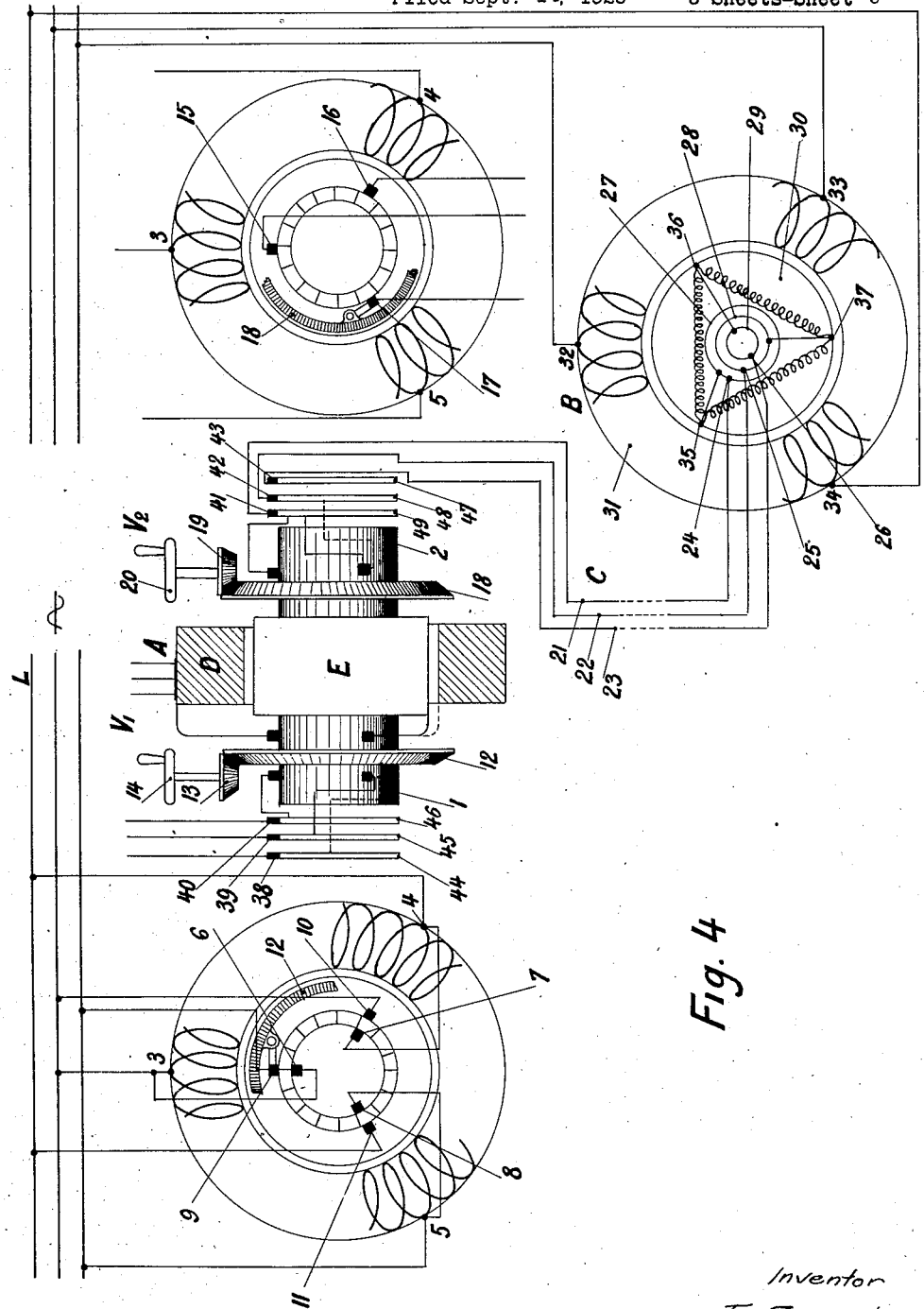
Figure 0:
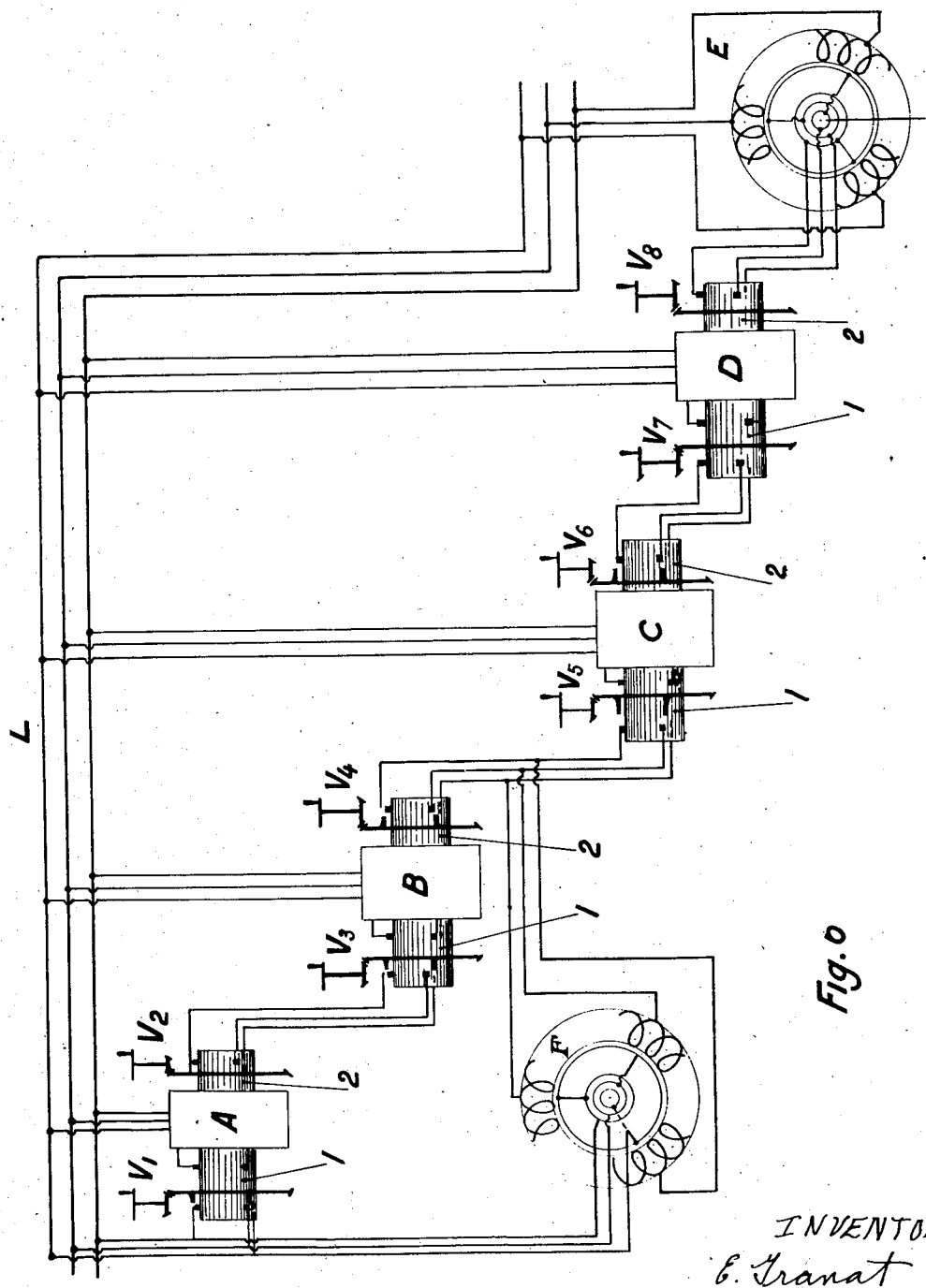

Fig. 1 is a detail view of a distant control device in which the transmitter is operated by a handle, and Fig. 2 is a diagrammatic view of the same device in which the transmitter is actuated by a mechanical element which is itself driven through suitable transmission means. Fig. 3 is a diagrammatic view of a differential transmission arrangement with multiple controlling station and a polyphase receiver with double supply. Fig. 4 is a diagrammatic view showing another differential transmission arrangement comprising a single controlling station and a receiver with single supply. Fig. 5 is a diagrammatic view of another differential transmission arrangement wherein the transmitter of Fig. 4 is combined with the receiver of Fig. 3. Fig. 6 is a diagrammatic view of another differential transmission device wherein suitable transmitters of the type shown in Fig. 4, which are connected in series, serve at the same time as transmitters and receivers.

The arrangement shown in Fig. 1 comprises a stator 1 which is provided with a uniformly distributed three-phase winding to which the current is supplied at the three equidistant contact points 4, 5, 6. The suitably wound rotor 2 is provided with a commutator 3 and is supplied with current by the three stationary brushes 7, 8, 9 which are connected with the line wires L. The device 30 is movable about the said commutator, said device comprising three brushes 10, 11, 12 set at 120 degrees apart, the same being controlled by the hand wheel 31 through the medium of the bevel gearing 32 and 33. The said brushes are connected to the three respective wires 16, 17, 18 which connect the transmitter A with the receiver B.

The receiver B comprises a stator provided with a uniformly distributed three-phase winding 19. The said stator is supplied by the three equidistant contacts 21, 22, 23 which are connected with the respective wires 13, 14, 15 of the three-phase line. The three-phase rotor comprises the three slip rings 27, 28, 29 co-operating with the respective stationary brushes 24, 25, 26 which are connected with the respective wires 16, 17, 18 of the line C.

The operation is as follows:

The stator and the rotor of the transmitter supplied by the three-phase current of the line L, whose frequency is F, will each set up a revolving field. The phase displacement of these two fields is constant, and depends upon the position of the stationary brushes 7, 8, 9, so that the rotor of the transmitter will be actuated at a determined speed. The E. M. F. at the rotatable brushes 10, 11, 12 is displaced in phase relatively to the E. M. F. of the main line, and this displacement will depend upon the position of the rotatable brushes 10, 11, 12 relatively to the position of the stationary brushes 7, 8, 9.

During the time in which the set of brushes 10, 11, 12 remains stationary, the frequency of the current in the line C will have the same value as the frequency F of the current supplying the line L. The rotor of the receiver which is connected with the brushes 10, 11, 12 by the wires 16, 17, 18 is supplied with three-phase current of the same frequency F. The stator and the rotor of the receiver, which are both supplied by an alternating current whose frequency is F, will each set up a revolving field having the same speed, so that the said supply will occasion no relative speed between the revolving field of the stator and of the rotor. No mechanical couple will be produced, and the rotor will hence remain stationary.

But if the set of the three rotatable brushes 10, 11, 12 is displaced by means of the hand wheel 31, for instance through the medium of the bevel gearing 32 and 33, this will vary the phase displacement between the E. M. F. of the line (brushes 7, 8, 9) and the E. M. F. at the brushes 10, 11, 12, and hence the frequency of the current in the line C will vary during the period of movement according to the displacement of the brushes 10, 11, 12.

The difference in frequency $f$ due to the rotation of the set of rotatable brushes will be proportional to the speed of the rotatable brushes relatively to the velocity of the revolving field of the transmitter.

This current of variable frequency $F_1 = F + f$ which supplies the three-phase winding 20 of the rotor of the receiver B by means of the wires 16, 17, 18 and of the brushes 24, 25, 26 and the slip rings 27, 28, 29 respectively connected with three equidistant contact points on the rotor 10 will set up a revolving field which rotates at a variable speed, said speed being different from that of the revolving field of the stator.

The revolving field of the rotor will thus be displaced relatively to the stator field, thus producing a certain couple, so that the rotor of the receiver will rotate in the proper direction through an angle which corresponds exactly to the displacement of the rotating brushes of the transmitter. The receiver acts as a three-phase auto-synchronous motor operating at a speed which is variable within very large limits, with small variations of torque.

Fig. 2 represents an electric transmitting device of the aforesaid type in which the set of movable brushes of the transmitter is controlled directly by the rotation of a suitable receiving element Z. The said transmitter will exactly reproduce the movement of the said receiver.

The aforesaid distant control device serves chiefly for differential control with polyphase current, and will reproduce upon the receiving shaft the algebraic sum of the movements of a certain number of transmitters.

An analogous distant control device, operated by continuous current, has been set forth in the U. S. patent application 21,175 filed on the 6th of April, 1925.

Fig. 3 shows a differential electric transmitting system operating upon alternating current, which affords the algebraic sum of any number of corrections upon the shaft of a receiver by the utilization of a double-feed type of polyphase receiver as set forth in the said patent application.

The said device comprises two transmitters of the aforesaid type. Firstly, the transmitter D supplies the rotor of the receiver F. Secondly, the transmitter E supplies the stator of the receiver F, so that the rotor of the receiver F will rotate through an angle represented by the algebraic sum of the displacements of the brush sets of each transmitter. I may further use mechanical control for the rotation of the brush set of a transmitter G, by means of the shaft of the receiver F; said brushes will supply the rotor of an additional receiver I with alternating current at variable frequency, the stator being supplied by the transmitter H. I thus collect upon the shaft of the receiver I the algebraic sum of the movements of the three transmitters. By the aforesaid series mounting of the transmitters and receivers, I can obtain the sum of an unlimited number of corrections.

The aforesaid transmitter A may be modified in the following manner in order to constitute a differential transmission arrangement of a different type wherein a single control station (Fig. 4) is employed. The stator is supplied with three-phase current from the line L by three equidistant contacts 3, 4, 5. The rotor E comprises two commutators 1 and 2. Around the commutator 1 are disposed two sets of brushes; one set is stationary and comprises the three brushes 6, 7, 8 which are connected with the respective contact points 3, 4, 5 of the stator; the other set is movable and comprises the three brushes 9, 10, 11. This latter set may be displaced by means of the hand wheel 14, through the medium of the two bevel gears 12 and 13. The brushes 9, 10, 11 are connected with the line L by the three slip rings 44, 45, 46 and the three stationary brushes 38, 39, 40. The commutator 2 is provided with a set of three rotatable brushes 15, 16, 17 mounted upon a toothed ring 18. The said set is controlled by the hand wheel 20 through the medium of the two bevel gears 18 and 19. The brushes 15, 16, 17 are connected with the respective wires 21, 22, 23 of the line C through the medium of the slip rings 47, 48, 49 and the stationary brushes 41, 42, 43. The rotor is of the same type as above set forth.

The operation is as follows:

If the movable set of the commutator I is displaced through a certain angle $a$, the phase of the E. M. F. supplying the rotor at the brushes 9, 10, 11 will vary, and hence the E. M. F. supplying the rotatable brushes of the commutator 2 will be changed in phase by a like angle. Due to the fixed position of the three brushes 6, 7, 8 connected with the stator, the speed of rotation of the transmitter is independent of the position of the three movable brushes 9, 10, 11.

This displacement of the brushes 9, 10, 11 will produce in the connecting line C a variation in frequency relatively to the frequency of the main line. The revolving field of the receiver will thus be displaced with reference to the field of the stator. This will produce a certain torque, and the rotor of the receiver will rotate in the proper direction through an angle $a$ corresponding exactly to the displacement of the set of rotatable brushes 9, 10, 11 of the transmitter. If the movable set of the commutator 2 is now displaced through an angle $b$ this will produce in the connecting line C a variation of frequency with reference to the frequency of the main line, and the rotor of the receiver will turn through the angle $b$, as above set forth.

The said arrangement thus provides an electric distant control system of the differential type, enabling a given transmitting station to transmit the algebraic sum of two movements. I may further dispose around a given commutator a plurality of sets of movable brushes in order to increase the number of unit movements which are transmitted.

By the combination of the transmitter shown in Fig. 4 with the receiver shown in Fig. 3, I am enabled to obtain the sum of a certain number of movements in a distant receiver, by the use of several transmitters. In this manner, the device described hereunder and shown in Fig. 5 will afford the sum of four movements in a single receiver, and consists of the following elements. I employ two transmitters A—B of the same type as the transmitter A of Fig. 4 and a receiver C which is the same as the receiver B of Figs. 1 to 4. The rotor of the receiver C is connected with the three wires of the line F leading from the transmitter B through the medium of 3 brushes co-operating with 3 respective slip rings. The stator of the receiver C is connected with the three wires of the line E leading from the transmitter A. In this manner, any rotation of the controlling wheels $V_1$ $V_2$ of the transmitter A will cause the corresponding displacement of the rotor field of the receiver, and any rotation of the wheels $V_3$ $V_4$ of the transmitter B will cause the corresponding displacement of the rotor field of the receiver. In consequence, the rotation of the rotor D relatively to the stator will correspond to the algebraic sum of the movements of the four wheels $V_1$ $V_2$ $V_3$ $V_4$. I may control the wheels $V_1$ $V_2$ of another transmitter A by the receivers of two systems of transmission or by a receiver and a hand control device, and may thus obtain a great number of combinations for differential transmission, adding together as many unit elements as may be desired.

The transmission arrangement shown in Fig. 6 comprises a series of transmitters of the type shown in Fig. 4. Herein all the stators of the said transmitters are supplied from a common three-phase line L. The rotatable brushes of the commutator 2 of each transmitter are electrically connected with the rotatable brushes of the commutator 1 of the succeeding transmitter.

The rotatable brushes of the commutator 2 of the last transmitter D are connected through the three brushes and the three corresponding slip rings with the rotor of a receiver E of the type described in Fig. 1 wherein the stator is supplied by the main line L.

It will be noted that the resulting displacement of the rotor of the receiver corresponds to the algebraic sum of the unit movements of the wheels $V_1$ $V_2$ $V_3$ $V_4$ $V_5$ $V_6$ $V_7$ $V_8$. By employing the requisite number of transmitters, I can thus obtain the sum of any desired number of movements. The stator of the receiver may also be supplied by a three-phase line leading from another set of transformers in series, thus obtaining the sum:

$$(V_2+V_2+V_n)+(V'_1+V'_2+V_m).$$

Should it be desired to obtain in a receiver F, for example, the sum $V_1+V_2+V_3+V_4$ of only a portion of the unit movements of the set of transmitters, its stator can be supplied by the line L and its rotor by the rotatable brushes controlled by the hand wheel $V_4$, thus affording in a receiver the sum: $V_1+V_2+V_3+V_4$.

What I claim is:

1. In an electric distant control transmission arrangement: a polyphase main line, a transmitting station comprising a stator provided with a polyphase winding which is supplied at N equidistant contact points by said main line, a wire wound rotor, a commutator for said rotor, brushes connected to said main line and supplying the said rotor with polyphase current, a movable brush holder, and brushes carried by said brush holder and rotatable about the commutator, a receiving station comprising a stator supplied by the polyphase main line, and a rotor; and wires connecting the rotatable brushes of the transmitter to the rotor of the receiving station.

2. In an electric distant control transmission arrangement: a polyphase main line, a transmitting station comprising a stator provided with a polyphase winding which is supplied at N equidistant contact points by said main line, a wire wound rotor, an auxiliary motor controlling said rotor, a commutator for said rotor, brushes connected to said main line and supplying the said rotor with polyphase current, a movable brush holder, and brushes carried by said brush holder and rotatable about the commutator, a receiving station comprising a stator supplied by the polyphase main line, and a rotor; and wires connecting the rotatable brushes of the transmitter to the rotor of the receiving station.

3. In an electric distant control transmission arrangement: a polyphase main line, a transmitting station comprising a stator provided with a polyphase winding which is supplied at N equidistant contact points by said main line, a wire wound rotor, a commutator for said rotor, brushes connected to said main line and supplying the said rotor with polyphase current, a movable brush holder, and brushes carried by said brush holder and rotatable about the commutator, a receiving element whose shaft controls said brush holder, a receiving station comprising a stator supplied by the polyphase main line, and a rotor; and wires connecting the rotatable brushes of the transmitter to the rotor of the receiving station.

4. A distant control transmission arrangement of the differential type comprising a type of receiver as set forth in claim 1 which receives, due to the supply of its stator and rotor by two polyphase distant control lines, movements which are independent of one another, and which by reason of the series mounting of the transmitters and the receivers of this type, will afford the algebraic sum of any suitable number of movements.

5. In an electric distant control transmission arrangement: a polyphase main line, a transmitting station comprising a stator provided with a polyphase winding which is supplied at N equidistant contact points by said main line, a wire wound rotor, a commutator for said rotor, rotatable brushes connected to said main line and supplying the said rotor with polyphase current, a movable brush holder and brushes carried by said brush holder and rotatable about the commutator, a receiving station comprising a stator supplied by the polyphase main line, and a rotor; and wires connecting the rotatable brushes of the transmitter to the rotor of the receiving station.

6. In an electric distant control transmission arrangement: a polyphase main line, a transmitting station comprising a stator provided with a polyphase winding which is supplied at N equidistant contact points by said main line, a wire wound rotor, a commutator for said rotor, brushes connected to said main line and supplying the said rotor with polyphase current, a plurality of movable brush holders with independent control, and brushes carried by said brush holders and rotatable about the commutator, a receiving station comprising a stator supplied by the polyphase main line, and a rotor; and wires connecting the rotatable brushes of the transmitter to the rotor of the receiving station.

7. The combination of two transmitters as referred to in claim 5 whereof each comprises two sets of movable brushes, and a double supply receiver, together with the disposition of a plurality of transmitters and receivers of this type in series in order to afford the sum of a plurality of movements.

8. The combination assuring the sum of a plurality of movements by means of a series of transmitters as set forth in claim 5 whereof each comprises two sets of brushes connected in series and wherein the second movable brush set of the last transmitter supplies the rotor of a receiver.

9. The combination giving the sum of a plurality of movements by means of a series of transmitters as set forth in claim 5 whereof each comprises two sets of brushes connected in series and wherein the second movable brush set of the last transmitter supplies the rotor of a receiver, an auxiliary receiver having its rotor connected with the rotatable brushes of one of the transmitters in order to obtain the sum of part of the above-mentioned movements.

In testimony whereof I affix my signature.

ELIE GRANAT.